(12) United States Patent
Saitou et al.

(10) Patent No.: US 9,762,294 B2
(45) Date of Patent: Sep. 12, 2017

(54) COMMUNICATION SYSTEM

(71) Applicant: DENSO CORPORATION, Kariya, Aichi-pref. (JP)

(72) Inventors: Takashi Saitou, Okazaki (JP); Akira Takaoka, Okazaki (JP); Koji Ito, Nagoya (JP); Koichi Ito, Handa (JP)

(73) Assignee: DENSO CORPORATION, Kariya, Aichi-pref (JP)

( * ) Notice: Subject to any disclaimer, the term of this patent is extended or adjusted under 35 U.S.C. 154(b) by 309 days.

(21) Appl. No.: 14/431,216

(22) PCT Filed: Aug. 2, 2013

(86) PCT No.: PCT/JP2013/004703
§ 371 (c)(1),
(2) Date: Mar. 25, 2015

(87) PCT Pub. No.: WO2014/049932
PCT Pub. Date: Apr. 3, 2014

(65) Prior Publication Data
US 2015/0263792 A1    Sep. 17, 2015

(30) Foreign Application Priority Data

Sep. 26, 2012 (JP) .................................. 2012-212471

(51) Int. Cl.
  *H01F 27/42* (2006.01)
  *H01F 37/00* (2006.01)
  (Continued)

(52) U.S. Cl.
  CPC ............. *H04B 5/0037* (2013.01); *H01Q 1/46* (2013.01); *H01Q 7/00* (2013.01); *H02J 5/005* (2013.01); *H04B 3/56* (2013.01)

(58) Field of Classification Search
  CPC ... H04B 3/46; H04B 3/54; H04B 3/56; H04B 5/0037; H04B 5/0031; B60R 60/03; B60R 16/00; H02J 50/80; H02J 50/40
  (Continued)

(56) References Cited

U.S. PATENT DOCUMENTS 4,264,827 A * 4/1981 Herzog ................... H04L 12/40
                                                          307/17
2010/0033156 A1   2/2010 Abe et al.
(Continued)

FOREIGN PATENT DOCUMENTS

JP    S52137915 A    11/1977
JP    H02131032 A    5/1990
(Continued)

OTHER PUBLICATIONS

International Search Report and Written Opinion (in Japanese with English Translation) for PCT/JP2013/004703, mailed Aug. 27, 2013; ISA/JP.

*Primary Examiner* — Thomas Skibinski
(74) *Attorney, Agent, or Firm* — Harness, Dickey & Pierce, P.L.C.

(57) ABSTRACT

The communication system includes a first communication device, a second communication device, and a third communication device. The first communication device outputs a high frequency alternating current power, and a power receiving circuit of the second communication device receives the high frequency alternating current power via a second antenna. A power line is connected between the second antenna and the power receiving circuit. A first power line has a first semicircle portion and a second power line has a second semicircle portion. The first and second semicircle portions are combined together to provide a loop-shaped antenna. The third communication device receives the high frequency alternating current power output (Continued)

from the loop-shaped antenna. At least two of the first, second, or third communication devices transmit or receive communication signals using respective antennas. The first and second power lines are twisted with each other at a portion other than the loop-shaped antenna.

10 Claims, 4 Drawing Sheets

(51) Int. Cl.
    *H01F 38/00*     (2006.01)
    *H04B 5/00*     (2006.01)
    *H01Q 7/00*     (2006.01)
    *H04B 3/56*     (2006.01)
    *H01Q 1/46*     (2006.01)
    *H02J 5/00*     (2016.01)

(58) Field of Classification Search
    USPC .................. 307/104, 9.1, 10.1, 11, 17, 3, 4; 375/257, 258; 320/104, 103, 108, 109, 320/137; 333/12; 340/12.32, 13.23; 323/305; 701/1
See application file for complete search history.

(56) References Cited

U.S. PATENT DOCUMENTS

| | | | |
|---|---|---|---|
| 2011/0043163 A1* | 2/2011 | Baarman | H02J 5/005 320/108 |
| 2011/0196541 A1* | 8/2011 | Bauman | G05B 19/0421 700/284 |
| 2014/0153655 A1* | 6/2014 | Abe | H04B 5/0018 375/257 |

FOREIGN PATENT DOCUMENTS

| | | |
|---|---|---|
| JP | 2005045327 A | 2/2005 |
| JP | 2008085890 A | 4/2008 |
| WO | WO-2007029438 A1 | 3/2007 |

\* cited by examiner

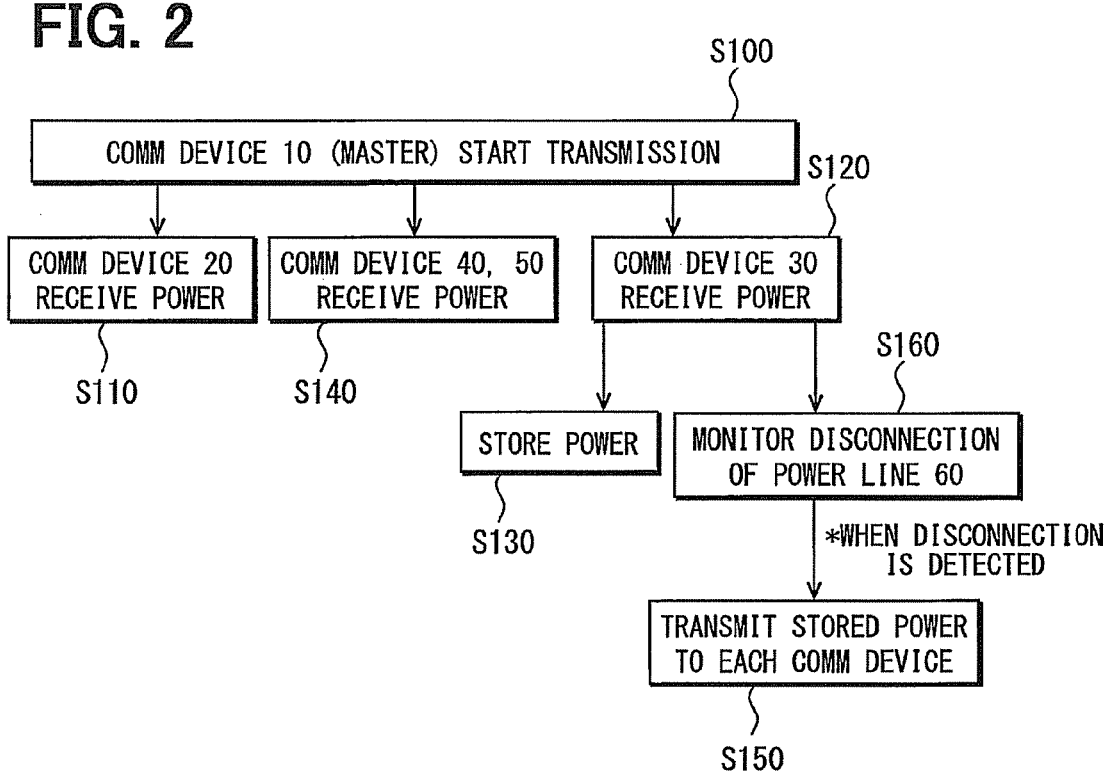
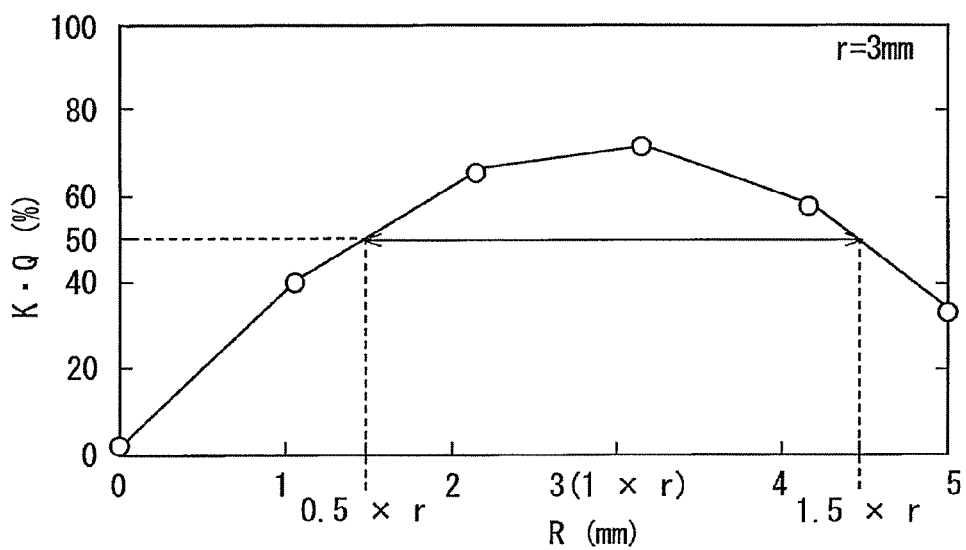

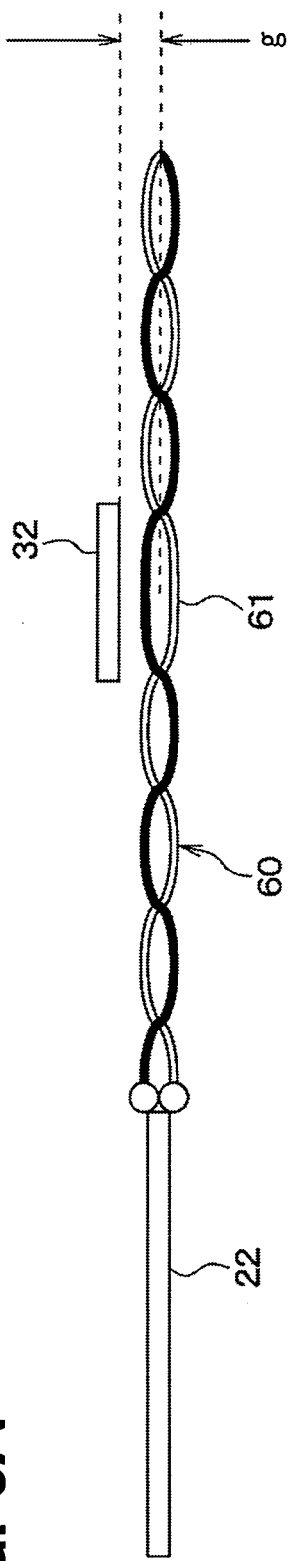
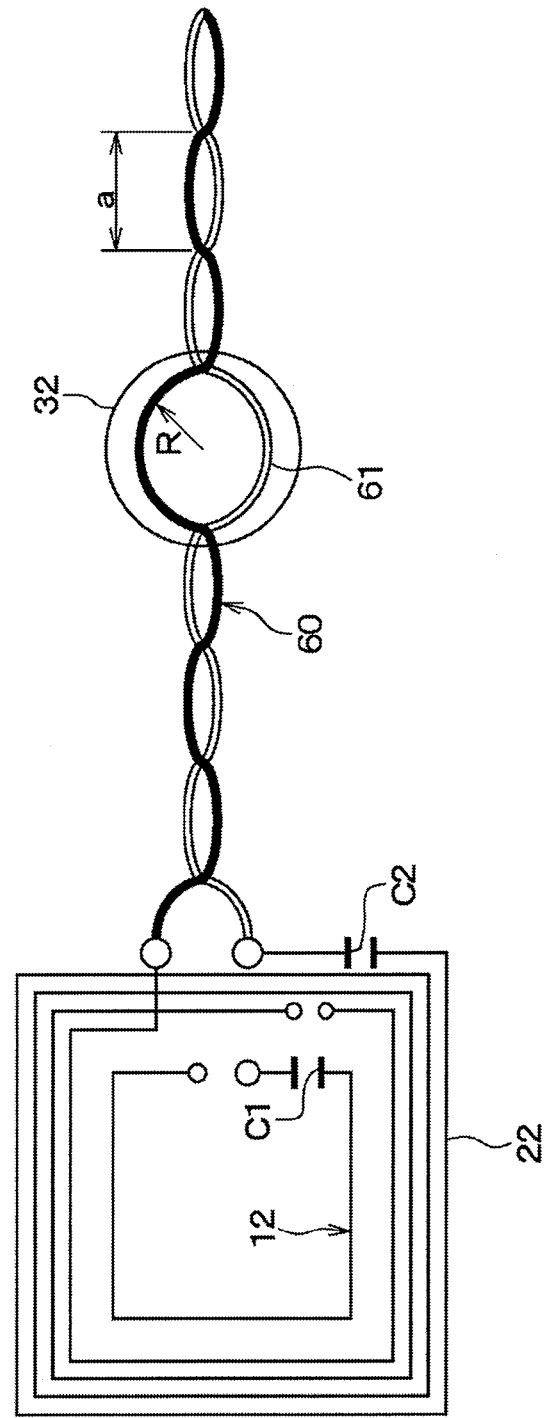
FIG. 5A
FIG. 5B

COMMUNICATION SYSTEM

CROSS REFERENCE TO RELATED APPLICATIONS

This application is a U.S. National Phase Application under 35 U.S.C. 371 of International Application No. PCT/JP2013/004703 filed on Aug. 2, 2013 and published in Japanese as WO 2014/049932 A1 on Apr. 3, 2014. This application is based on and claims the benefit of priority from Japanese Patent Application No. 2012-212471 filed on Sep. 26, 2012. The entire disclosures of all of the above applications are incorporated herein by reference.

TECHNICAL FIELD

The present disclosure relates to a communication system including multiple communication devices that communicate with one another.

BACKGROUND ART

In a conventional power supply system, a power source outputs a high frequency alternating current power to a power line and multiple communication devices wirelessly receive the high frequency alternating current power from the power line (for example, refer to Patent Literature 1).

Further, a communication system includes parallel power supply lines through which communication signals propagate and a pickup device that receives the communication signals from the parallel power supply lines via a coupling device (for example, refer to Patent Literature 2).

Based on the systems disclosed in above-described Patent Literature 1 and Patent Literature 2, the inventors of the present disclosure studied on a communication system having a power line and a communication device. In this communication system, the power line transfers a superposition of high frequency power and a communication signal, and the communication device receives the high frequency power and the communication signal via a coupling device in a electromagnetic induction manner. After the study on this communication system, the inventors of the present disclosure found that a part of the high frequency alternating current power and the communication signals leak as electromagnetic waves at a portion other than the coupling device.

PRIOR ART LITERATURES

Patent Literatures

[Patent Literature 1] WO 2007/029438 A1
[Patent Literature 2] JP 2005-45327 A

SUMMARY OF INVENTION

In view of the foregoing difficulties, it is an object of the present disclosure to provide a communication system that suppresses a leakage of high frequency alternating current power and communication signals from a power line.

According to an aspect of the present disclosure, a communication system includes a first communication device, a second communication device, a power line, and a third communication device. The first communication device includes a first antenna that outputs a high frequency alternating current power. The second communication device includes a second antenna and a power receiving circuit, and the power receiving circuit receives, via the second antenna, the high frequency alternating current power output from the first antenna. The power line is connected between the second antenna and the power receiving circuit. The power line includes a first power line, which is positioned between a predetermined portion of the power line and the second antenna, and a second power line, which is positioned between the predetermined portion of the power line and the power receiving circuit. The first power line includes at least one first semicircle portion having a semicircle shape, and the second power line includes at least one second semicircle portion having a semicircle shape. The at least one first semicircle portion and the at least one second semicircle portion are combined together to provide at least one loop-shaped antenna. The third communication device includes a third antenna, which receives, via the third antenna, the high frequency alternating current power output from the at least one loop-shaped antenna. At least two of the first communication device, the second communication device, or the third communication device transmit or receive communication signals via corresponding antennas. The first power line and the second power line are twisted with each other to configure a twisted line pair at a portion other than the at least one loop-shaped antenna in the power line.

In the above system, the power line has the twisted line pair, which is configured by the first power line and the second power line, at a portion other than the loop-shaped antenna. Thus, a leakage of the high frequency alternating current power and the communication signals from a portion other than the loop-shaped antenna can be suppressed.

BRIEF DESCRIPTION OF DRAWINGS

The above and other objects, features and advantages of the present invention will become more apparent from the following detailed description made with reference to the accompanying drawings. In the drawings:

FIG. 2 is a diagram showing an operation of the vehicular communication system according to the above embodiment;

FIG. 3 is a graph showing a relation between a radius of a loop-shaped antenna and a space transfer efficiency;

FIG. 5A and FIG. 5B are diagrams each of which showing a dimension of the power line and a dimension of the antennas according to the above embodiment.

EMBODIMENTS FOR CARRYING OUT INVENTION

Figure 1:
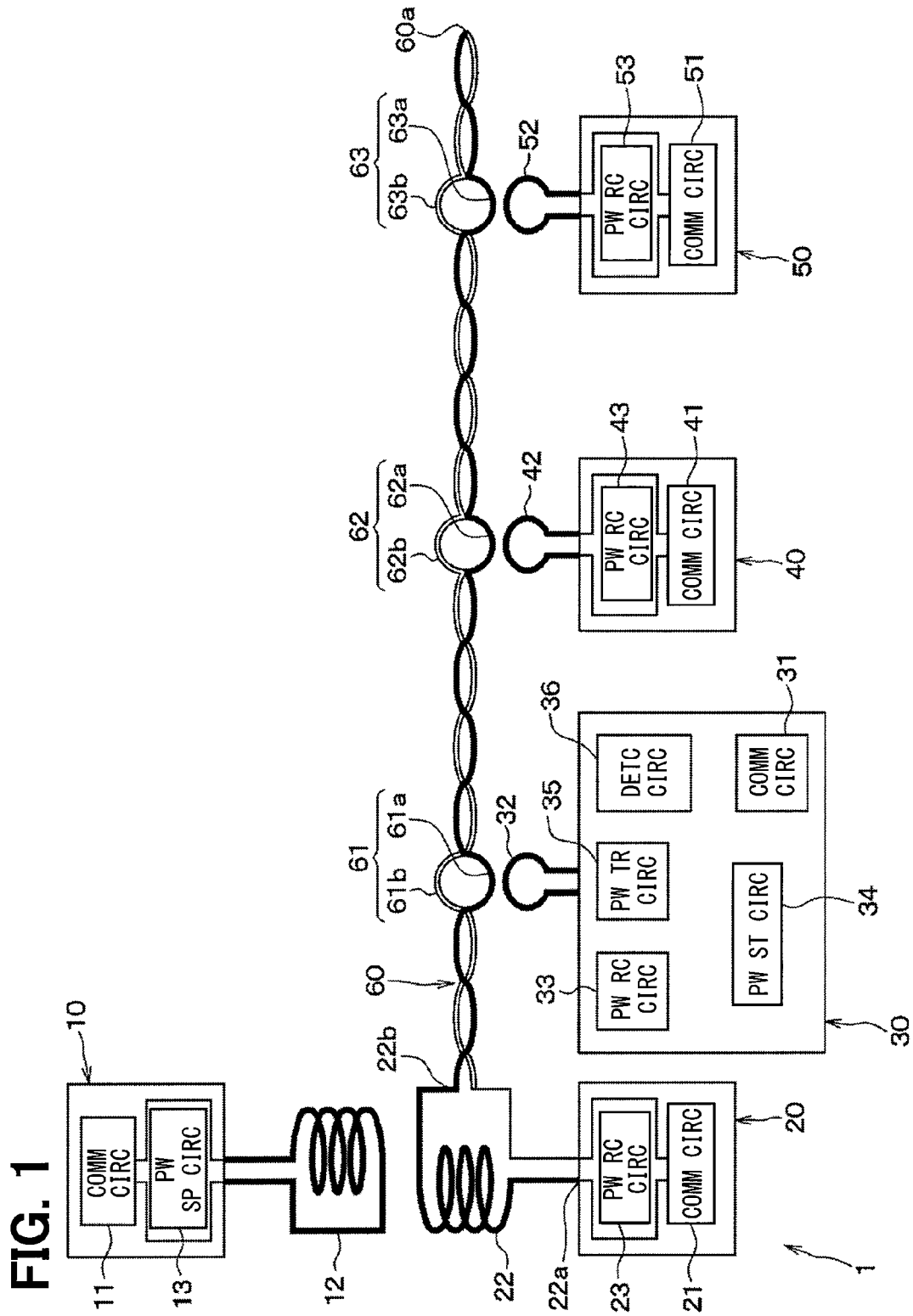
FIG. 1 is a diagram showing an electric configuration of a vehicular communication system according to an embodiment of the present disclosure.

The following will describe embodiments of the present disclosure with reference to the drawings. FIG. 1 shows an electric configuration of a vehicular communication system 1 according to an embodiment of the present disclosure.

The vehicular communication system 1 according to the present embodiment includes a communication device 10 as a master and communication devices 20, 30, 40 as slaves. The vehicular communication system 1 operates in a master-slave manner.

The communication device 10 includes a communication circuit (COMM CIRC) 11, an antenna 12, and a power supplying circuit (PW SP CIRC) 13. The communication circuit 11 transmits or receives a communication signal via the antenna 12. In the present embodiment, the antenna 12 is provided by a coil-shaped antenna. The power supplying circuit 13 outputs a high frequency alternating current power to the antenna 12 in order to supply the electric power to the communication devices 20, 30, 40, 50.

The communication device 20 includes a communication circuit (COMM CIRC) 21, an antenna 22, and a power receiving circuit (PW RC CIRC) 23. The communication circuit 21 transmits a communication signal via the antenna 22, and receives a communication signal via the antenna 22. In the present embodiment, the antenna 22 is provided by a coil-shaped antenna.

In the antenna 22, one electrode 22a is connected with the communication circuit 21 and the power receiving circuit 23, and the other electrode 22b is connected with the communication circuit 21 and the power receiving circuit 23 via the power line 60. With this configuration, the power line 60 is connected between the power receiving circuit 23 and the antenna 22. The power line 60 supplies electric power to the communication devices 20, 30, 40, and provides loop-shaped antennas 61, 62, 63. Details of the power line 60 will be described later.

The power receiving circuit 23 receives, via the antenna 22, the high frequency alternating current power output from the antenna 12. The power receiving circuit 23 converts the high frequency alternating current power to a direct current power and supplies the converted direct current power to the communication circuit 21 and other electric loads.

The communication device 30 includes a communication circuit (COMM CIRC) 31, an antenna 32, a power receiving circuit (PW RC CIRC) 33, a power storage circuit (PW ST CIRC) 34, a power transfer circuit (PW TR CIRC) 35, and a disconnection detection circuit (DETC CIRC) 36. The communication circuit 31 receives a communication signal from the loop-shaped antenna 61 via the antenna 32, and outputs a communication signal to the loop-shaped antenna 61 via the antenna 32. In the present embodiment, the antenna 32 is provided by a coil-shaped antenna (receiving coil).

The power receiving circuit 33 receives the high frequency alternating current power from the loop-shaped antenna 61 via the antenna 32, and converts the high frequency alternating current power that is received to a direct current power. Then, the power receiving circuit 33 outputs the direct current power to the power storage circuit 34. The power storage circuit 34 stores the direct current power to a battery or to a capacitor. The power transfer circuit 35 converts the direct current power stored in the power storage circuit 34 to a high frequency alternating current power, and transfers the high frequency alternating current power to the loop-shaped antenna 61 via the antenna 32. The disconnection detection circuit 36 detects a disconnection between the communication device 10 and the communication device 30 based on a communication state between the two communication devices 10, 30.

The communication device 40 includes a communication circuit (COMM CIRC) 41, an antenna 42, and a power receiving circuit (PW RC CIRC) 43. The communication circuit 41 transmits a communication signal to the loop-shaped antenna 62 via the antenna 42, and receives a communication signal from the loop-shaped antenna 62 via the antenna 42.

In the present embodiment, the antenna 42 is provided by a coil-shaped antenna (receiving coil).

The power receiving circuit 43 receives, via the antenna 42, the high frequency alternating current power output from the loop-shaped antenna 62. The power receiving circuit 43 converts the received high frequency alternating current power to a direct current power, and supplies the converted direct current power to the communication circuit 41 and other electric loads.

The communication device 50 includes a communication circuit (COMM CIRC) 51, an antenna 52, and a power receiving circuit (PW RC CIRC) 53. The communication circuit 51 transmits, to the loop-shaped antenna 63, a communication signal via the antenna 52, and receives, from the loop-shaped antenna 63, a communication signal via the antenna 52. In the present embodiment, the antenna 52 is provided by a coil-shaped antenna (receiving coil).

The power receiving circuit 53 receives, via the antenna 52, the high frequency alternating current power output from the loop-shaped antenna 63. The power receiving circuit 53 converts the received high frequency alternating current power to a direct current power, and supplies the converted direct current power to the communication circuit 51 and other electric loads.

The electric load of the communication device 20 is greater than an electric load of each other communication device 30, 40, 50. The communication device 20, 30, 40, or 50 may include, for example, an actuator of a servomotor of a vehicle air conditioning apparatus as the electric load.

In the present embodiment, the power line 60 is folded at a longitudinal intermediate portion 60a toward the antenna 22 (toward the power receiving circuit 23). The power line 60 transfers a superposition of the high frequency power and the communication signal. The transfer operation will be described later in detail.

As described above, the power line 60 is connected between the power receiving circuit 23 and the antenna 22.

In the power line 60, a segment positioned between the intermediate portion 60a and the antenna 22 provides a first power line. The first power line includes semicircle portions 61a, 62a, 63a. The semicircle portions 61a, 62a, 63a are distant from one another.

In the power line 60, a segment positioned between the intermediate portion 60a and the power receiving circuit 23 (or the communication circuit 21) provides a second power line. The second power line includes semicircle portions 61b, 62b, 63b. The semicircle portions 61b, 62b, 63b are distant from one another.

In FIG. 1, a bold black line (filled in black) indicates the first power line, and a white line (hollow line) indicates the second power line.

A combination of the semicircle portions 61a and 61b provides the loop-shaped antenna 61. A combination of the semicircle portions 62a and 62b provides the loop-shaped antenna 62. A combination of the semicircle portions 63a and 63b provides the loop-shaped antenna 63.

The following will describe an operation of the vehicular communication system 1 according to the present embodiment with reference to FIG. 2.

First, the communication device 10 starts a transmission of the power (step S100). Specifically, the power supplying circuit 13, via the antenna 12, outputs the high frequency alternating current power. The high frequency alternating current power is output from the antenna 12 as electromagnetic waves to the antenna 22. After the high frequency alternating current power is received by the antenna 22, a part of the high frequency alternating current power is supplied to the power receiving circuit 23. That is, the communication device 20 receives the electric power (step S100). Specifically, the communication device 20 receives the high frequency alternating current power from the communication device 10 in high power.

As described above, a part of the high frequency alternating current power received by the antenna 22 is supplied to the power receiving circuit 23, and remaining part of the high frequency alternating current power is output to the loop-shaped antenna 61, 62, 63 as electromagnetic waves via the power line 60.

The power receiving circuit 33 receives, via the antenna 32, the high frequency alternating current power from the loop-shaped antenna 61. That is, the communication device 30 receives the electric power (step S120). Then, the power receiving circuit 33 converts the high frequency alternating current power, which is received via the antenna 32, to the direct current power, and supplies the direct current power to the power storage circuit 34. Then, the power storage circuit 34 stores the direct current power (step S130).

The power receiving circuit 43 receives, via the antenna 42, the high frequency alternating current power from the loop-shaped antenna 62. That is, the communication device 40 receives the electric power (step S140). The communication device 40 receives the high frequency alternating current power from the communication device 10 in low power.

The power receiving circuit 53 receives, via the antenna 52, the high frequency alternating current power from the loop-shaped antenna 63. That is, the communication device 50 receives the electric power (step S140). The communication device 50 receives the high frequency alternating current power from the communication device 10 in low power.

As described above, the communication device 10 supplies the high frequency alternating current power to the communication devices 20, 30, 40, 50.

The communication device 10 also communicates with the communication devices 20, 30, 40, 50.

Specifically, the communication circuit 11 of the communication device 10 outputs call signals for calling each of the communication devices 20, 30, 40, 50 at predetermined intervals. The communication circuit 11 outputs the call signals via the antenna 12 as electromagnetic waves. The communication circuit 21 of the communication device 20 receives the call signals via the antenna 22.

In response to the reception of the call signals, the communication circuit 21 of the communication device 20 outputs, via the antenna 22, response signals to the antenna 12. The communication circuit 11 of the communication device 10 receives the response signal via the antenna 12.

The call signals received by the antenna 22 are transmitted via the power line 60, and are output by the loop-shaped antennas 61, 62, 63.

For example, the communication circuit 31 receives, via the antenna 32, the call signal output from the loop-shaped antenna 61. Then, the communication circuit 31 outputs a response signal via the antenna 32. When the loop-shaped antenna 61 receives the response signal from the communication circuit 31, the loop-shaped antenna 61 transmits the response signal to the antenna 22 via the power line 60, and the antenna 22 outputs the response signal to the antenna 12. Then, the communication circuit 11 receives the response signal, which is output from the communication 31, from the antenna 12.

For example, the communication circuit 41 receives, via the antenna 42, the call signal output from the loop-shaped antenna 62. Then, the communication circuit 41 outputs a response signal via the antenna 42. When the loop-shaped antenna 62 receives the response signal from the communication circuit 41, the loop-shaped antenna 62 transmits the response signal to the antenna 22 via the power line 60, and the antenna 22 outputs the response signal to the antenna 12. Then, the communication circuit 11 receives the response signal, which is output from the communication 41, from the antenna 12.

For example, the communication circuit 51 receives, via the antenna 52, the call signal output from the loop-shaped antenna 63. Then, the communication circuit 51 outputs a response signal via the antenna 52. When the loop-shaped antenna 63 receives the response signal from the communication circuit 51, the loop-shaped antenna 63 transmits the response signal to the antenna 22 via the power line 60, and the antenna 22 outputs the response signal to the antenna 12. Then, the communication circuit 11 receives the response signal, which is output from the communication 51, from the antenna 12.

The disconnection detection circuit 36 of the communication device 30 monitors a disconnection state (specifically, a disconnection state between the antenna 22 and the loop-shaped antenna 61 in the power line 60) of the power line 60 (step S160).

For example, when the call signals transmitted from the communication device 10 are received by the communication circuit 31 at predetermined intervals, the disconnection detection circuit 36 determines that no disconnection occurs in the power line 60 between the antenna 22 and the loop-shaped antenna 61.

For example, when the call signals transmitted from the communication device 10 are failed to be received by the communication circuit 31 for a predetermined period, the disconnection detection circuit 36 determines an occurrence of the disconnection in the power line 60 between the antenna 22 and the loop-shaped antenna 61.

When the disconnection detection circuit 36 determines an occurrence of the disconnection in the power line 60, the disconnection detection circuit 36 controls the power transfer circuit 34 to output the direct current power stored in the power storage circuit 34 as a high frequency alternating current power via the antenna 32 (step S150). The high frequency alternating current power output via the antenna 32 is received by the loop-shaped antenna 61. The high frequency alternating current power received by the loop-shaped antenna 61 is transferred to other loop-shaped antennas 62, 63. Then, the loop-shaped antennas 62, 63 provide the high frequency alternating current power transferred from the loop-shaped antenna 61 to the communication devices 40, 50.

The power receiving circuit 43 receives, via the antenna 42, the high frequency alternating current power output from the loop-shaped antenna 62. That is, the communication device 40, which is directly coupled with the communication device 30, receives the high frequency alternating current power from the communication device 30.

The power receiving circuit 53 receives, via the antenna 52, the high frequency alternating current power output from the loop-shaped antenna 63. That is, the communication device 50, which is directly coupled with the communication device 30, receives the high frequency alternating current power from the communication device 30.

As described above, even when a disconnection occurs in the power line 60, the communication device 30 is able to supply the high frequency alternating current power to other communication devices 40, 50.

In the foregoing embodiment, the communication system 1 includes the communication device 10, the communication device 20, the power line 60, and the communication devices 30, 40, 50. The communication device 10 outputs the high frequency alternating current power via the antenna 12. The communication device 20 has the power receiving circuit 23 that receives, via the antenna 22, the high frequency alternating current power output from the antenna 12. The power line 60 is connected between the antenna 22 and the power receiving circuit 23. The power line 60 includes the first power line and the second power line. The first power line is connected between the intermediate portion 60a of the power line 60 and the antenna 22, and includes the semicircle portions 61a, 62a, 63a. The second power line is connected between the intermediate portion 60a of the power line 60 and the power receiving circuit 23, and includes the semicircle portions 61b, 62b, 63b. A combination of the semicircle portions 61a and 61b configures the loop-shaped antenna 61. A combination of the semicircle portions 62a and 62b configures the loop-shaped antenna 62. A combination of the semicircle portions 63a and 63b configures the loop-shaped antenna 63. The communication devices 30, 40, 50 receive the high frequency alternating current power output from the respective loop-shaped antennas 61, 62, 63 via respective antennas 32, 42, 52. The communication device 10 is configured to transmit or receive communications signals to or from each of the communication devices 20, 30, 40 via a corresponding antenna. In the power line, a portion other than the loop-shaped antennas 61, 62, 63 configures a twisted line pair (twisted pair structure) in which the first power line is twisted with the second power line as a pair.

The twisted line pair is a cable in which the first power line and the second power line are twisted with each other. Thus, the magnetic field generated by the first power line and the magnetic field generated by the second power line are compensated by each other. Thus, in the power line 60, a leakage of the high frequency alternating current power and the communication signals from a portion other than the loop-shaped antenna 61 can be suppressed.

In the present embodiment, the frequency of the high frequency alternating current power is set equal to a resonance frequency of the communication system 1. Thus, in the power line 60, a leakage of the high frequency alternating current power from the portion other than the loop-shaped antenna 61 can be further suppressed.

In the present embodiment, the communication devices 30, 40, 50 transmit or receive the high frequency alternating current power and the communication signals to or from the power line 60 in a wireless manner. Thus, connecting elements, such as connectors, are not required for connecting each of the communication devices 30, 40, 50 with the power line 60.

The following will describe a space transfer efficiency K·Q between the loop-shaped antenna 61, 62, 63 and the corresponding antenna 32, 42, 52 of the communication device 30, 40, 50 with reference to FIG. 3, FIG. 4, FIG. 5A, and FIG. 5B.

FIG. 3 is a graph showing a relation between the space transfer efficiency K·Q on the vertical axis and a radius R of the loop-shaped antenna 61 on the horizontal axis (in the figure, illustrated as loop radius R as shown in FIG. 5B).

The space transfer efficiency K·Q is a parameter showing an efficiency of power transfer from the loop-shaped antenna 61 (62, 63) to the antenna 32 (42, 52).

When the radius R of the loop-shaped antenna 61 is within a range of 1.5 mm to 4.5 mm and the radius r of the antenna 32 (receiving coil) is equal to 3 mm, the space transfer efficiency K·Q is equal to or higher than 50%. That is, when the radius R of the loop-shaped antenna 61 is within a range of 0.5xr to 1.5xr, the space transfer efficiency K·Q is equal to or higher than 50%. On the other hand, when the radius R of the loop-shaped antenna 61 is out of the range of 0.5xr to 1.5xr, the space transfer efficiency K·Q is lower than 50%.

The radius r of the antenna 32 is a radius of a cross section of the antenna 32. Herein, the cross section of the antenna 32 is perpendicular to an axis direction of the antenna 32.

A relation between the radius R of the loop-shaped antenna 62, 63 and the space transfer efficiency K·Q thereof is similar to the relation between the radius R of the loop-shaped antenna 61 and the space transfer efficiency K·Q thereof.

An amount of the high frequency alternating current power transferred from the loop-shaped antenna 61 (62, 63) to the antenna 32 (42, 52) is defined corresponding to a dimension of the loop-shaped antenna 61 (62, 63).

Figure 4:
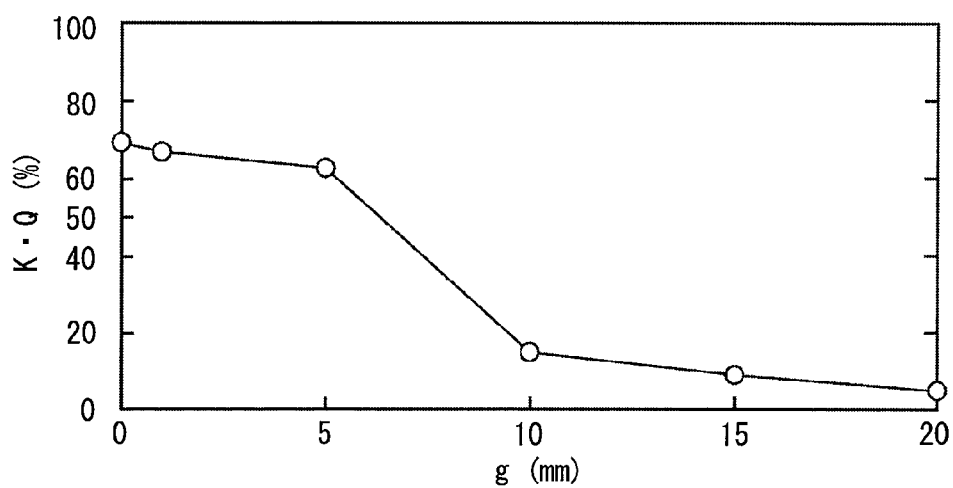
FIG. 4 is a diagram showing a relation between a distance and a space transfer efficiency.

FIG. 4 is a graph showing a relation between a space transfer efficiency K·Q on the vertical axis and a distance g (refer to FIG. 5A) on the horizontal axis. As shown in FIG. 5A, the distance g is a distance between the loop-shaped antenna 61 and the antenna 32 (receiving coil).

When the distance g is equal to or shorter than 6 mm and the radius r of the cross section of the antenna 32 (receiving coil) is equal to 3 mm, the space transfer efficiency K·Q is equal to or higher than 50%. That is, when the distance g is equal to or shorter than 2xr (twice of radius r), the space transfer efficiency K·Q is equal to or higher than 50%. When the distance g is longer than 2xr, the space transfer efficiency K·Q is lower than 50%.

A relation between the distance g related to the loop-shaped antenna 62, 63 and the space transfer efficiency K·Q thereof is similar to the relation between the distance g related to the loop-shaped antenna 61 and the space transfer efficiency K·Q thereof.

An amount of the high frequency alternating current power transferred from the loop-shaped antenna 61 (62, 63) to the antenna 32 (42, 52) is also defined corresponding to the distance g.

As described above, the amount of the high frequency alternating current power transferred from the loop-shaped antenna 61 (62, 63) to the antenna 32 (42, 52) of the corresponding communication device is defined according to the dimension of the loop-shaped antenna 61 (62, 63) and the distance g between the loop-shaped antenna and the antenna of the corresponding communication device. Thus, when the consumption power of each communication device 30, 40, 50 is different from one another, the amount of the high frequency alternating current power required by each communication device 30, 40, 50 can be appropriately set according to the electric load of each communication device 30, 40, 50 by adjusting the dimension of the loop-shaped antenna and the distance g. Thus, an excessive power supply to the communication device 30, 40 50 can be suppressed. Accordingly, there is no need to dispose an overcurrent protection structure in each communication device 30, 40, 50.

In FIG. 5A and FIG. 5B, symbol C1 indicates a capacitor that configures a part of the antenna 12. The symbol C2 indicates a capacitor that configures a part of the antenna 22. In the present embodiment, a pitch of the twisted line pair is set to 12.5 (mm).

Other Embodiments

In the foregoing embodiment, the communication system is applied to the vehicle. As another example, the communication system may be applied to a different equipment other than the vehicle. For example, the communication system may be applied to a household equipment.

In the foregoing embodiment, the communication device 10 operates as the master, and the communication devices 20, 30, 40, 50 operate as slaves, and the communication system operates in a master-slave manner. As another example, in the communication system, the communication devices 10, 20, 30, 40, 50 may operate in a different manner other than the master-slave manner.

In the foregoing embodiment, the communication device 10 performs communication with the communication devices 20, 30, 40, 50 as an example. As another example, any two of the communications devices 10, 20, 30, 40, 50 may perform communication with each other. That is, any two of the communications devices 20, 30, 40, 50 may perform communication with each other.

In the foregoing embodiment, the antennas 12, 22, 32, 42, 52 are provided by the coil-shaped antennas. As another example, the antennas 12, 22, 32, 42, 52 may be provided by different types of antennas (for example, loop-shaped antenna) other than the coil-shaped antennas.

In the foregoing embodiment, the power line 60 includes three loop-shaped antennas (61, 62, 63) as an example. As another example, the power line 60 may include only one loop-shaped antenna, or two loop-shaped antennas. As another example, the power line 60 may include four or more loop-shaped antennas.

The communication device 10 corresponds to a first communication device, and the antenna 12 corresponds to a first antenna. The communication device 20 corresponds to a second communication device, and the antenna 22 corresponds to a second antenna. The communication device 30 corresponds to a third communication device, and the antenna 32 corresponds to a third antenna. The communication device 40 or 50 corresponds to a fourth communication device, and the antenna 42 or 52 corresponds to a fourth antenna.

While the disclosure has been described with reference to preferred embodiments thereof, it is to be understood that the disclosure is not limited to the preferred embodiments and constructions. The disclosure is intended to cover various modification and equivalent arrangements. In addition, while the various combinations and configurations, which are preferred, other combinations and configurations, including more, less or only a single element, are also within the spirit and scope of the disclosure.

What is claimed is:

1. A communication system comprising:
a first communication device including a first antenna, the first antenna outputting a high frequency alternating current power;
a second communication device including a second antenna and a power receiving circuit, the power receiving circuit receiving, via the second antenna, the high frequency alternating current power output from the first antenna;
a power line connected between the second antenna and the power receiving circuit, wherein the power line includes a first power line, which is positioned between a predetermined portion of the power line and the second antenna, and a second power line, which is positioned between the predetermined portion of the power line and the power receiving circuit, the first power line includes at least one first semicircle portion having a semicircle shape and the second power line includes at least one second semicircle portion having a semicircle shape, the at least one first semicircle portion and the at least one second semicircle portion being combined together to provide at least one loop-shaped antenna; and
a third communication device including a third antenna, the third communication device receiving, via the third antenna, the high frequency alternating current power output from the at least one loop-shaped antenna, wherein
at least two of the first communication device, the second communication device, or the third communication device transmit or receive communication signals via corresponding antennas, and
the first power line and the second power line are twisted with each other to configure a twisted line pair at a portion other than the at least one loop-shaped antenna in the power line.

2. The communication system according to claim 1, wherein
a frequency of the high frequency alternating current power is set equal to a resonance frequency of the communication system.

3. The communication system according to claim 1, wherein
an amount of the high frequency alternating current power that is transferred from the at least one loop-shaped antenna to the third antenna is defined according to a distance between the at least one loop-shaped antenna and the third antenna and a dimension of the at least one loop-shaped antenna.

4. The communication system according to claim 3, wherein
the third antenna is a coil-shaped antenna.

5. The communication system according to claim 4, wherein
a radius of the at least one loop-shaped antenna is equal to or longer than a half of a radius of the third antenna and equal to or shorter than one and a half of the radius of the third antenna.

6. The communication system according to claim 5, wherein
the distance between the at least one loop-shaped antenna and the third antenna is equal to or shorter than twice of the radius of the third antenna.

7. The communication system according to claim 1, further comprising
a fourth communication device including a fourth antenna, wherein
the first power line includes at least two first semicircle portions and the second power line includes at least two second semicircle portions,
one of the at least two first semicircle portions is combined with a corresponding one of the at least two second semicircle portions to provide a first loop-shaped antenna,
another one of the at least two first semicircle portions is combined with corresponding another one of the at least two second semicircle portions to provide a second loop-shaped antenna,
the third communication device is positioned corresponding to the first loop-shaped antenna and the fourth communication device is positioned corresponding to the second loop-shaped antenna, and
the fourth antenna receives, via the fourth antenna, the high frequency alternating current power output from the second loop-shaped antenna.

8. The communication system according to claim 7, wherein the third communication device further includes a power storage circuit that stores an electric power based on the high frequency alternating current power received via the third antenna.

9. The communication system according to claim 8, wherein the third communication device further includes:

a power transfer circuit transferring, based on the electric power stored in the power storage circuit, a high frequency alternating current power to the first loop-shaped antenna via the third antenna; and a disconnection detection circuit detecting a disconnection of the power line between the first loop-shaped antenna and the second antenna, wherein, when the disconnection detection circuit detects the disconnection of the power line between the first loop-shaped antenna and the second antenna, the disconnection detection circuit controls the power transfer circuit to output the high frequency alternating current power to the first loop-shaped antenna via the third antenna, and the fourth communication device receives the high frequency alternating current power from the second loop-shaped antenna, the high frequency alternating current power is output from the power transfer circuit of the third communication device to the first loop-shaped antenna and is transferred to the second loop-shaped antenna via the power line.

10. The communication system according to claim 1, wherein at least one of the first antenna or the second antenna is a coil-shaped antenna.

* * * * *